United States Patent
Rivers et al.

(10) Patent No.: US 11,077,633 B2
(45) Date of Patent: Aug. 3, 2021

(54) METHOD OF FORMING NON-PNEUMATIC TIRE INCLUDING PRESSURE APPLICATION BETWEEN AN INTERMEDIATE SECTION AND AN OUTER SHEAR BAND RING

(71) Applicant: Compagnie Generale des Etablissements Michelin, Clermont-Ferrand (FR)

(72) Inventors: Eric Rivers, Greenville, SC (US); Clayton Bohn, Jr., Mauldin, SC (US); Brian D Wilson, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 274 days.

(21) Appl. No.: 16/066,769

(22) PCT Filed: Nov. 4, 2016

(86) PCT No.: PCT/US2016/060544
§ 371 (c)(1),
(2) Date: Jun. 28, 2018

(87) PCT Pub. No.: WO2017/116561
PCT Pub. Date: Jul. 6, 2017

(65) Prior Publication Data
US 2019/0016076 A1     Jan. 17, 2019

Related U.S. Application Data

(63) Continuation of application No. PCT/US2015/067623, filed on Dec. 28, 2015.

(51) Int. Cl.
*B29D 30/02* (2006.01)
*B60C 7/14* (2006.01)
(Continued)

(52) U.S. Cl.
CPC .............. *B29D 30/02* (2013.01); *B29D 30/00* (2013.01); *B29D 30/2607* (2013.01); *B60B 9/04* (2013.01);
(Continued)

(58) Field of Classification Search
CPC .... B60C 7/00; B60C 7/14; B60C 7/22; B60C 2007/146; B29D 30/00; B29D 30/02;
(Continued)

(56) References Cited

U.S. PATENT DOCUMENTS 1,086,333 A   2/1914  Russell
5,685,926 A   11/1997 Kejha
(Continued)

FOREIGN PATENT DOCUMENTS

CN     101668646 A    3/2010
CN     201506207 U    6/2010
(Continued)

OTHER PUBLICATIONS

Hikoji Yamamoto, JP-2012091555-A, updated machine translation. (Year: 2012).*

(Continued)

*Primary Examiner* — Robert C Dye
*Assistant Examiner* — Sedef E Paquette
(74) *Attorney, Agent, or Firm* — Neal P. Pierotti

(57) ABSTRACT

A method of forming a non-pneumatic tire is provided that includes the steps of providing an outer shear band ring (12) that has an inner diameter. An intermediate section (14) is provided that has a supporting structure. An outer diameter (102) of the intermediate section (14) in the uncompressed state is greater than the inner diameter (70) of the outer shear band ring (12). The intermediate section is compressed from the uncompressed state to a compressed state, and is inserted inside of the outer shear band ring (12). Compression of the (Continued)

intermediate section is released when the intermediate section is inside of the outer shear band ring, and the intermediate section (14) moves from the compressed state to a state of interference fit with the outer shear band ring (12).

5 Claims, 7 Drawing Sheets

(51) Int. Cl.
    B29D 30/26      (2006.01)
    B29D 30/00      (2006.01)
    B60B 9/04       (2006.01)
    B60B 9/10       (2006.01)
    B60B 9/26       (2006.01)
(52) U.S. Cl.
    CPC . B60B 9/10 (2013.01); B60B 9/26 (2013.01);
          B60C 7/14 (2013.01); B60C 2007/146
                                          (2013.01)
(58) Field of Classification Search
    CPC ........ B29D 30/2607; B29D 2030/2692; B60B
            2320/12; B60B 3/001; B60B 9/04; B60B
            9/10; B60B 9/26; B29L 2030/006
    See application file for complete search history.

(56) References Cited

U.S. PATENT DOCUMENTS

| | | | |
|---|---|---|---|
| 6,286,572 B1 | 9/2001 | Chen | |
| 7,013,939 B2 | 3/2006 | Rhyne | |
| 2001/0030402 A1 | 10/2001 | White | |
| 2003/0024383 A1* | 2/2003 | Roberts | F15B 15/02 92/120 |
| 2007/0089820 A1 | 4/2007 | Gabrys et al. | |
| 2008/0314486 A1 | 12/2008 | Manesh et al. | |
| 2009/0211675 A1* | 8/2009 | Louden | B60B 9/02 152/55 |
| 2010/0018621 A1* | 1/2010 | Thompsom | B60C 7/22 152/302 |
| 2010/0200131 A1 | 8/2010 | Iwase | |
| 2011/0248554 A1 | 10/2011 | Chon | |
| 2012/0205017 A1 | 8/2012 | Endicott | |
| 2012/0318458 A1 | 12/2012 | Araki | |
| 2015/0174953 A1 | 6/2015 | Cron | |
| 2015/0174954 A1* | 6/2015 | Asper | B60C 7/10 152/5 |
| 2015/0251493 A1 | 9/2015 | Ma | |
| 2015/0273946 A1 | 10/2015 | Abe | |
| 2016/0016426 A1 | 1/2016 | Endicott | |
| 2016/0167434 A1 | 6/2016 | Nishida | |
| 2017/0113491 A1* | 4/2017 | Iwamura | B60C 7/18 |
| 2018/0029422 A1* | 2/2018 | Thompson | B60C 11/0041 |

FOREIGN PATENT DOCUMENTS

| | | |
|---|---|---|
| DE | 702808 C | 1/1940 |
| DE | 20000034 U1 | 4/2000 |
| FR | 334354 A | 12/1903 |
| GB | 191410998 A | 11/1914 |
| GB | 978913 A | 1/1965 |
| GB | 2431383 A | 4/2007 |
| GB | 2481137 A | 12/2011 |
| JP | 4370599 B2 | 11/2009 |
| JP | 2012091555 A | 5/2012 |
| JP | 2012121559 A | 6/2012 |
| NL | 2002955 | 12/2010 |
| WO | 2005039865 A1 | 6/2005 |
| WO | 2017106704 A2 | 6/2017 |

OTHER PUBLICATIONS

European Patent Office; International Search Report and Written Opinion for patent application PCT/US2015/067623; dated Aug. 29, 2016; Publisher: European Patent Office, Rijswijk, Netherlands, pp. 1-11, enclosed.

European Patent Office; International Search Report and Written Opinion for patent application PCT/US2016/060544; dated Feb. 3, 2017; Publisher: European Patent Office, Rijswijk, Netherlands, pp. 1-11, enclosed.

* cited by examiner

METHOD OF FORMING NON-PNEUMATIC TIRE INCLUDING PRESSURE APPLICATION BETWEEN AN INTERMEDIATE SECTION AND AN OUTER SHEAR BAND RING

CROSS-REFERENCE TO RELATED APPLICATIONS

The present application is a 35 U.S.C. § 371 application of PCT/US16/60544 filed on Nov. 4, 2016 and entitled "Method of Forming Non-Pneumatic Tire Including Pressure Application Between an Intermediate Section and an Outer Shear Band Ring." PCT/US16/60544 claims the benefit of PCT/US15/67623 filed on Dec. 28, 2015 and entitled "Method of Forming Non-Pneumatic Tire Including Pressure Application Between an Intermediate Section and an Outer Shear Band Ring." PCT/US16/60544 and PCT/US15/67623 are both incorporated by reference herein in their entireties for all purposes.

FIELD OF THE INVENTION

The present invention relates generally to a method of constructing a non-pneumatic tire from a series of subsections. More particularly, the present application involves a method of constructing a non-pneumatic tire that includes the step of inserting an intermediate section into an outer shear band ring and using an interference fit to facilitate attachment.

BACKGROUND

Non-pneumatic tires for vehicles and other applications are known that may include a hub surrounded circumferentially by an outward radially disposed tread that includes an annular shear band ring. A supporting structure that may have a series of spokes can be disposed radially between the hub and shear band ring and can function to connect these two components. As the tire rotates under load, the spokes experience bending, extension and compression deformation when they are located downward near the contact patch of the tire. The spokes straighten outside the contact patch relieving the bending and compression deformation.

The formation of the non-pneumatic tire may involve the insertion of the shear band ring into a mold and then overmolding the supporting structure onto the interior of the shear band ring through injection molding. However, this will generate a large amount of pressure onto the shear band ring causing distortion and damage thereto. Further, injection molding of the supporting structure across the entire axial length of the non-pneumatic tire may be difficult in that material will not easily flow along the entire axial length during this process. Further, thin mold sections between features of the supporting structure, such as spokes, may be damaged by pressure variations in the manufacturing process.

Another method of formation involves the formation of the supporting structure and then subsequent attachment to the shear band ring. Features of the supporting structure such as spokes could be slid into sections of the shear band ring. Attachment through adhesives requires precise control of critical parameters such as temperature, humidity, coating thickness, application pressure, and clamping time. Further, such attachment requires very precise and expensive fixtures to properly locate features of the supporting structure, such as spokes, with respect to the shear band ring. Still further, the use of adhesives in the manufacturing process may cause fouling of the tooling and equipment by the adhesive itself. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
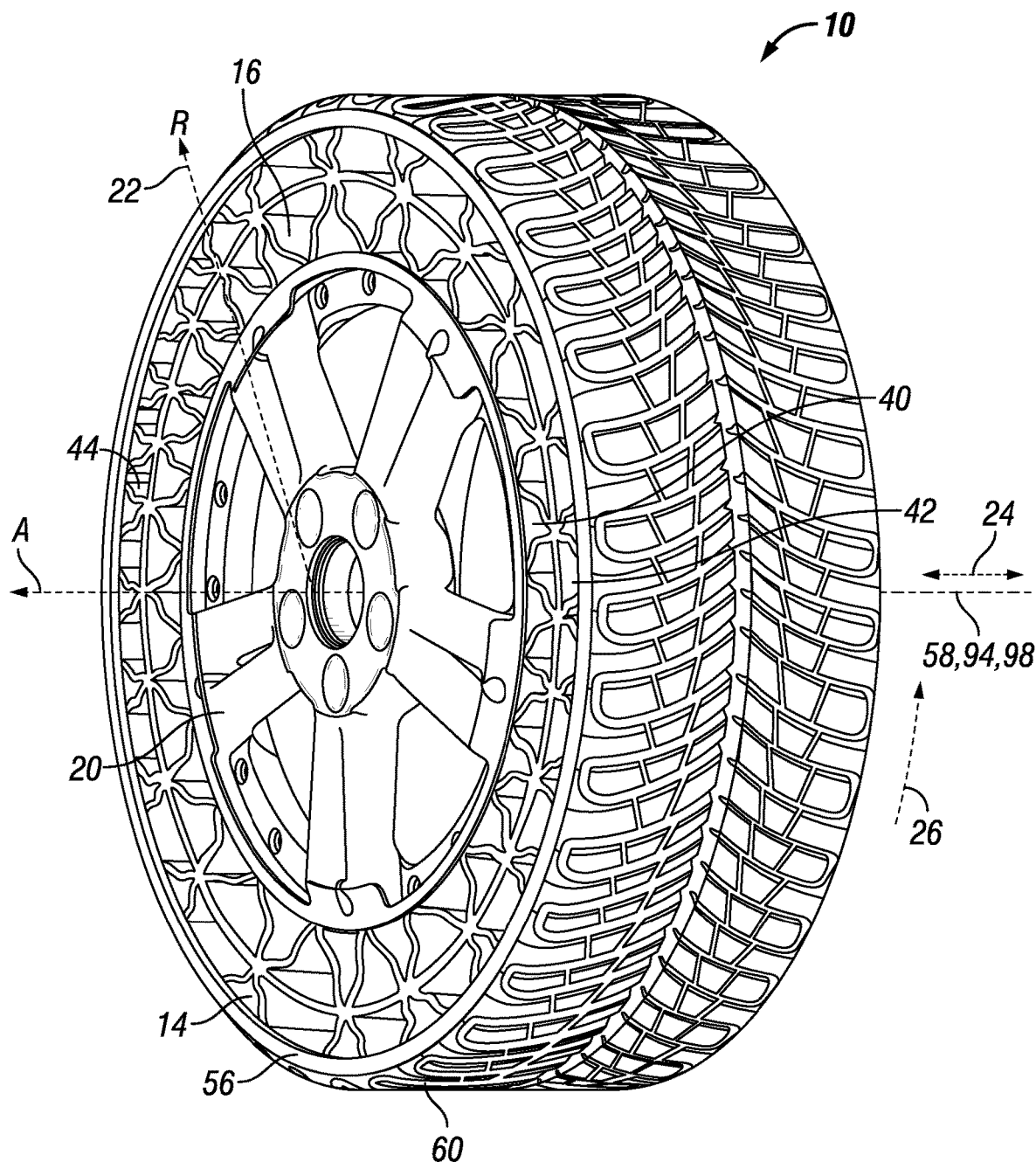
FIG. 1 is a perspective view of a non-pneumatic tire.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a method of forming a non-pneumatic tire 10 that includes a hub 20, a supporting structure 16, and a shear band ring 56. The method involves the construction of a plurality of intermediate sections 14 that could each have an inner shear band ring 18. The intermediate sections 14 may have outer diameters 102 that are larger than the inner diameter 70 of an outer shear band ring 12. The intermediate sections 14 can be compressed and then inserted into the outer shear band ring 12. The compression can be released in order to allow the intermediate sections 14 to move to a state of interference fit 100 in which they are retained to the outer shear band ring 12. Adhesive 74, 76 can be included at this point of engagement, and the assembly can be thermally cured in order to make the connection permanent if the adhesive 74, 76 is of a type that requires such curing. A hub 20 may be attached to the intermediate sections 14 to complete the assembly.

With reference to FIG. 1, a non-pneumatic tire 10 is shown through which a central axis 58 extends. The central axis 58 is identified with other components of the non-pneumatic tire 10 and relates to the position of these components once assembled into the non-pneumatic tire 10. The other directions identified herein, such as the radial direction 22, axial direction 24, and the circumferential direction 26, likewise relate to the position of the non-pneumatic tire 10 and its components when assembled. An axial direction 24 is defined as the direction along the central axis 58 or the direction parallel to the central axis 58. The radial direction 22 extends at a 90 degree angle to the axial direction 24, and the circumferential direction 26 extends around the arc length of the non-pneumatic tire 10, or its components, so as to circle 360 degrees the central axis 58. The axial direction 24, the radial direction 22 and the circumferential direction 26 are identified with other components in the drawings that are then subsequently assembled into the non-pneumatic tire 10 as their orientations would be upon assembly. The non-pneumatic tire 10 includes a hub 20 that can be mounted onto a wheel of the vehicle. The central axis 58 extends through the center of the hub 20.

Located outward from the hub 20 in the radial direction 22 is a supporting structure 16. The supporting structure 16 may be designed in a variety of manners. As shown, the supporting structure 16 includes an inner V pair spoke section 40, an interface ring 42, and an outer V pair spoke section 44. The spokes are V shaped with apexes that are oriented to and are located at one another between the inner and outer V pair spoke sections 40 and 44. However, it is to be understood that the supporting structure 16 can be provided in a variety of manners and need not include V shaped spokes, and need not include inner 40 and outer 44 sections in other embodiments. Instead, the supporting structure 16 may include simply a plurality of spokes that are linear in shape and that are arranged completely around the supporting structure 16 in the circumferential direction 26. As such, it is to be understood that the configuration of the supporting structure 16 illustrated and described is only exemplary and that other arrangements are possible in other configurations of the non-pneumatic tire 10 and method disclosed herein.

The non-pneumatic tire 10 also has a shear band ring 56 that engages the supporting structure 16 and is located radially outward from the supporting structure 16 in the radial direction 22. Tread 60 is also included in the non-pneumatic tire 10 and is attached to the shear band ring 56. The supporting structure 16 may be formed as a single component, or can be made by individually constructing two or three subcomponents and then assembling these two or three modular pieces together to form the supporting structure 16. Construction in two or three modular pieces may allow for benefits in cost and performance to be realized.

Figure 2:
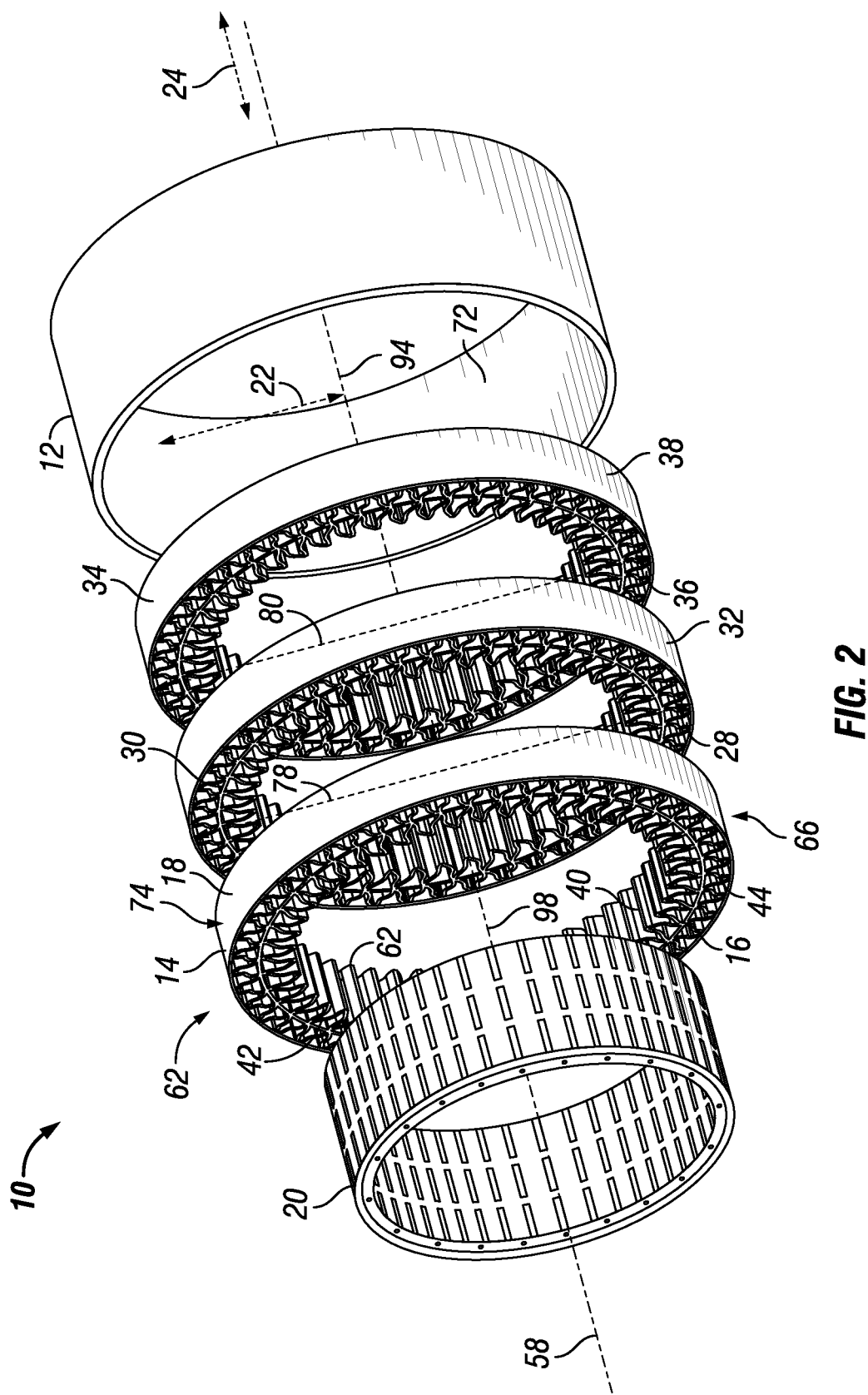
FIG. 2 is a perspective exploded assembly view of a non-pneumatic tire composed of a hub and a series of intermediate sections inserted into an outer shear band ring.

An exploded perspective view of a non-pneumatic tire 10 is shown in FIG. 2. The tire 10 includes a plurality of intermediate sections 14, 28 and 34 that can all be formed in the same manner with the same components. The intermediate sections include supporting structures 16, 30 and 36 that are located inward in the radial direction 22 from corresponding inner shear band rings 18, 32 and 38. The intermediate sections 14, 28 and 34 are positioned into an outer shear band ring 12 so as to lie against one another in the axial direction 24. The shear band ring 56 is thus made up of an outer shear band ring 12 and a number of inner shear band rings 18, 32 and 38 and is not formed as a single component. However, in other versions, the intermediate sections 14, 28 and 34 may lack inner shear band rings 18, 32 and 38 and thus the entire shear band ring 12 is made up of the outer shear band ring 12. In the version shown in FIG. 2, the various spokes of the supporting structures 16, 30, and 36 do not directly engage the outer shear band ring 12 but are instead offset therefrom by the inner shear band rings 18, 32 and 38. A hub 20 is located within and is attached to the intermediate sections 14, 28 and 34.

Figure 3:
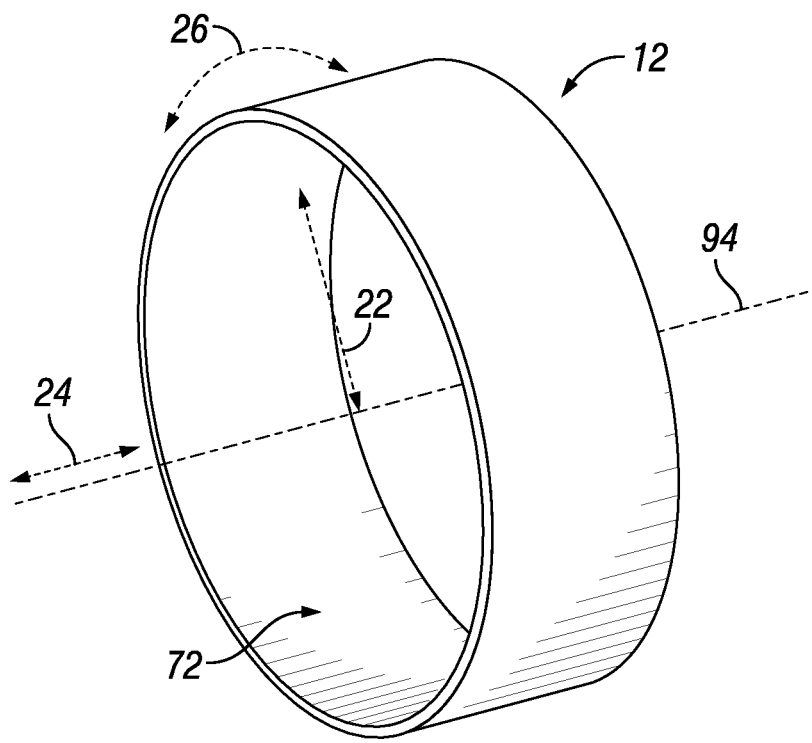
FIG. 3 is a perspective view of an outer shear band ring.
Figure 4:
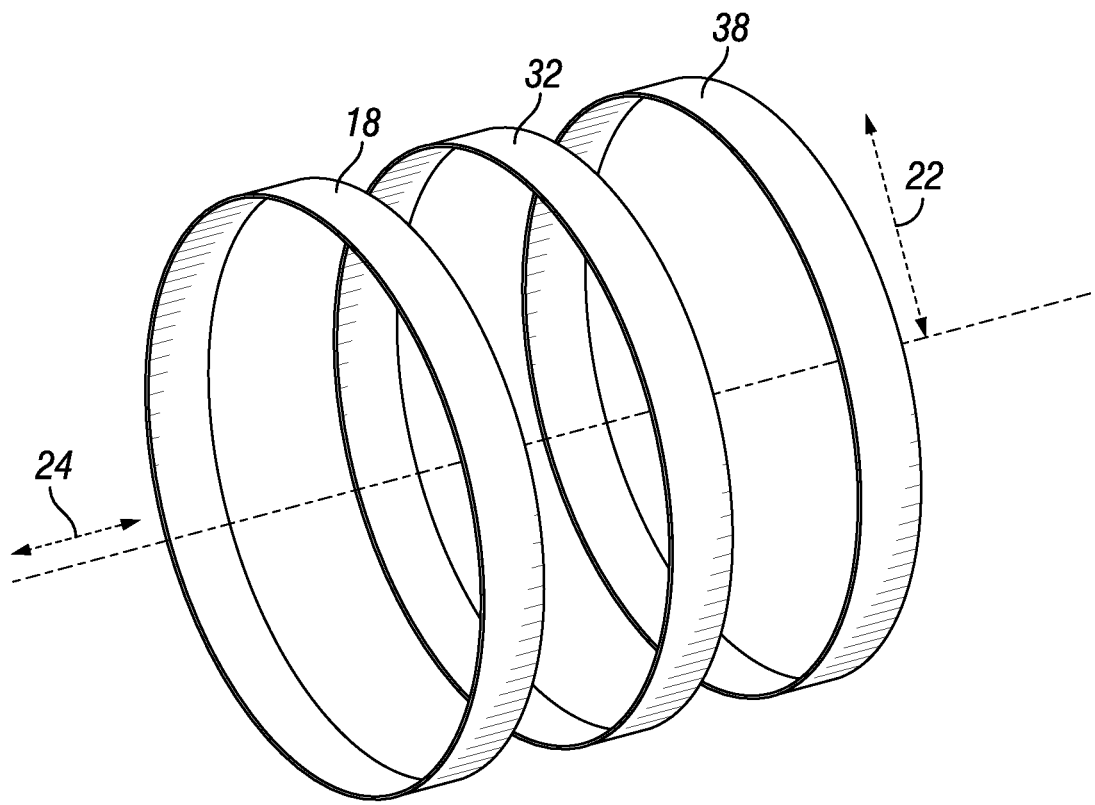
FIG. 4 is a perspective view of a series of inner shear band rings.

The method for forming the non-pneumatic tire 10 may first involve the building and curing of the outer shear band ring 12 and the inner shear band rings 18, 32 and 38. The outer shear band ring 12 is shown in FIG. 3, and three inner shear band rings 18, 32 and 38 are shown in FIG. 4. The number of inner shear band rings 18, 32 and 38 may vary depending upon the width of the outer shear band ring 12 which is the length of the outer shear band ring 12 in the axial direction 24. Any number of inner shear band rings 18, 32 and 38 may be utilized and they may or may not be sized the same in the axial direction 24. The number and size of the inner shear band rings 18, 32 and 38 may be dependent upon molding constraints of other features of the non-pneumatic tire 10 such as the spokes. The outer shear band ring 12 may include any number of layers of the resulting shear band ring 56. Likewise, the inner shear band rings 18, 32 and 38 can include any number of layers of the resulting shear band ring 56. In some embodiments, the inner shear band rings 18, 32 and 38 include two layers of the shear band ring 56. The inner shear band rings 18, 32 and 38 are portions of the shear band ring 56 and are not portions of the spokes and are not rings of the supporting structures, 16, 30 and 36 in that they can include the same materials as other portions of the shear band ring 56 such as the outer shear band ring 12. The number of layers and the thickness in the radial direction 22 of the inner shear band rings 18, 32 and 38 can be selected so that the inner shear band rings 18, 32 and 38 can flex inward some amount in the radial direction 22 so that they can be inserted into the outer shear band ring 12 when the intermediate sections 14, 28 and 34 are inserted.

Figure 5:
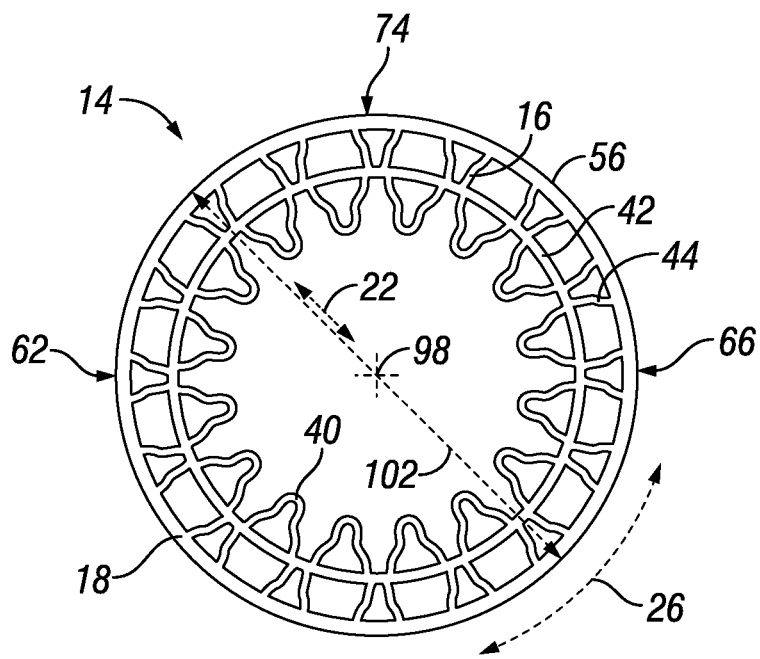
FIG. 5 is a side elevation view of an intermediate section formed by molding a supporting structure into an inner shear band ring.

The next step in the assembly process may be the formation of the intermediate section 14. Once the inner shear band ring 18 is formed, it may be placed as an insert within a mold for the formation of the supporting structure 16. The mold into which the inner shear band ring 18 may be placed can be an injection mold. With reference to FIG. 5, the supporting structure 16 may include an inner V pair spoke section 40, an interface ring 42, and an outer V pair spoke section 44. These sections 40, 42 and 44 can be injection molded and upon their formation by injection molding the outer V pair spoke section 44 can bond directly to the inner surface of the inner shear band ring 18. This type of process is known as overmolding in the injection molding process. The mold that includes the components of the supporting structure 16 such as the inner V pair spoke section 40, interface ring 42, and the outer V pair spoke section 44 may control the precision of location of the attachment of the spokes of the outer V pair spoke section 44 to the inner shear band ring 18 and may eliminate the challenges associated with attaching the spokes to the shear band ring 56. Such an attachment also minimizes the amount of material needed for attachment of the spokes to the shear band ring 56. In other versions of the method, the spokes and other structure of the supporting structure 16 is adhered to the inner surface of the inner shear band ring 18 without molding but through the use of adhesives.

The inner surface of the inner shear band ring 18 may be primed by being chemically prepared either by plasma or chemical adhesion promoter. This priming may be done before the injection molding in order to help the outer V pair spoke section 44 better adhere to the inner surface 52 of the inner shear band ring 18.

The components of the supporting structure 16 such as the inner V pair spoke section 40, interface ring 42, and outer V pair spoke section 44 can be made out of thermoplastic elastomers such as thermoplastic urethanes, polyether block amides, copolyester ethers, polyolefin elastomers, and plastomers. In some embodiments, other materials may be used to construct the inner V pair spoke section 40, interface ring 42, and outer V pair spoke section 44 could be more rigid thermoplastic materials such as polyethylene, polypropylene, and nylon. Although described as being molded with or otherwise formed with an inner shear band ring 18, it is to be understood that the intermediate section 14 need not include an inner shear band ring 18 in other embodiments. In some instances, the outer V pair spoke section 44 can include a ring of material to which the V shaped spokes engage, and this ring may be made of the same material as the V shaped spokes. In other instances, the ring may not be present, and the V shaped spokes could terminate at the outer diameter 102 of the intermediate section 14.

The intermediate section 14 is in an uncompressed state 62 as shown in FIG. 5 and has an outer surface 66 that is the outer surface of the inner shear band ring 18. If the inner shear band ring 18 were not present, the intermediate section 14 would still have an outer surface 66 that could be the outer surface of a ring of the outer V pair spoke section 44. If this ring were not present, the outer surface 66 would be portions of the outer V pair spoke section 44 and the outer surface 66 would be discontinuous in the circumferential direction 26. If the supporting structure 16 did not have any V shaped spokes and did not have an outer V pair spoke section 44, the outer surface 66 would be the outer surface of the structure of the supporting structure 16. The outer surface 66 as shown in FIG. 5 coincides with the outer diameter 102 in the uncompressed state 62 of the intermediate section 14. The outer surface 66 thus has a diameter that is the same as the outer diameter 102. If the outer surface 66 was discontinuous, the outer diameter 102 in the uncompressed state 62 would coincide with the portion of the discontinuous outer surface 66 that is farthest from the axis 98 in the radial direction 22.

The second intermediate section 28 may be constructed in a similar manner as the first intermediate section 14 as previously discussed. In this regard, the components of the second supporting structure 30 such as the outer V pair spoke section of the second supporting structure 30 may be molded onto the inner surface of the second inner shear band ring 32 through an overmolding in the injection molding process. The third intermediate section 34 may likewise be constructed in a similar manner as the first intermediate section 14 previously discussed. Components of the third supporting structure 36 such as the outer V pair spoke section can be molded onto the inner surface of the third inner shear band ring 38. The inner surfaces of the second and third inner shear band rings 32 and 38 may be prepped in the same manners as the inner surface of the inner shear band ring 18, and the materials making up the second and third intermediate sections 28 and 34 may be the same as the intermediate section 14 as previously discussed and a repeat of this information is not necessary. If additional intermediate sections are needed in other embodiments, they may be provided as previously discussed with respect to the first intermediate section 14. The various intermediate sections 14, 28 and 34 can be configured in a similar manner as one another so that their supporting structures 16, 30, and 36 are identical, or these supporting structures 16, 30 and 36 may differ from one another.

The intermediate section 14 has an outer diameter 102 in the uncompressed state 62 as shown in FIG. 5. The outer diameter 102 is the diameter of the outer surface 66 that extends all the way around the axis 98 of the intermediate section 14 in the circumferential direction 26. Although the outer surface 66 is continuous all the way around the axis 98 so that the entire outer surface 66 is the same distance from the axis 98 in the radial direction 22, it may be a discontinuous outer surface 66 in other embodiments. In these instances, portions of the outer surface 66 are farther from the axis 98 in the radial direction 22 than other portions of the outer surface 66. In the embodiment shown, the outer diameter 102 is the greatest diameter of the intermediate section 14.

Adhesive 74 can be applied onto the outer surface 66 when the intermediate section 14 is in the uncompressed state 62. The adhesive 74 may extend 360 degrees around the axis 98 so as to be present on the entire outer surface 66. The adhesive 74 can be any type of adhesive that can be used to connect the intermediate section 14 to the outer shear band ring 12. Although shown on the outer surface 66, adhesive 74 need not be present on the outer surface 66 in other variations of the assembly. The adhesive 74 may be a rubber based crosslinking material, such as cushion gum, that can be applied in a solid/skim or liquid form. Other adhesives used to make up the adhesive 74 could be polyurethane, cyanoacrylate, or epoxy based glue. The adhesive 74 can be applied in any manner such as through the use of a roll or gun applicator.

Figure 6:
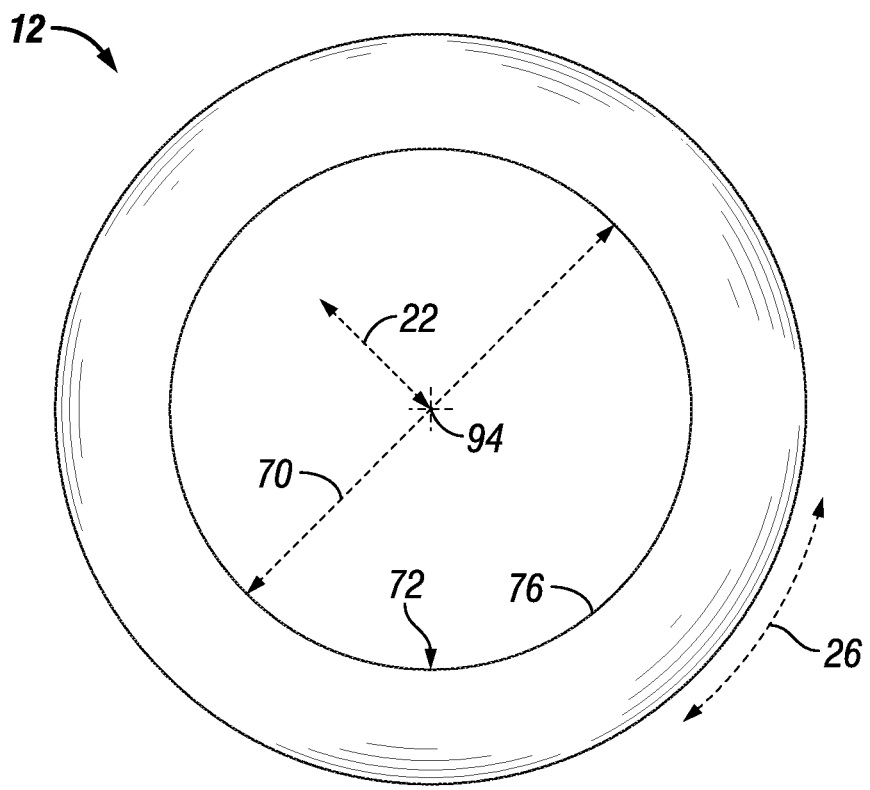
FIG. 6 is a side elevation view of an outer shear band ring.

The outer shear band ring 12 is shown in FIG. 6 and is configured as a ring. The outer shear band ring 12 has an axis 94 and has a hollow interior that is defined by an inner surface 72. The inner surface 72 is uniform around its entirety so that all points of the inner surface 72 are the same distance to the axis 94 in the radial direction 22. The outer shear band ring 12 has an inner diameter 70 that extends through the axis 94 to oppositely disposed positions of the inner surface 72. Adhesive 76 can be applied to the inner surface 72 along the entire inner surface 72 around the axis 94 in the circumferential direction 26. In other embodiments, the adhesive 76 is not applied to the inner surface 72, or is applied at some points along the inner surface 72 but not along the entire inner surface 72. The adhesive 76 can be cushion gum, and can be provided as described above with respect to the adhesive 74. Although shown on the inner surface 72, adhesive 76 need not be present on the inner surface 72 in other variations of the assembly. The adhesive 76 can be applied in any manner such as through the use of a roll or a gun applicator.

The adhesive 76 on the inner surface 72 and the adhesive 74 on the outer surface 66 may count in determining the size of the inner diameter 70 and the size of the outer diameter 102.

Figure 7:
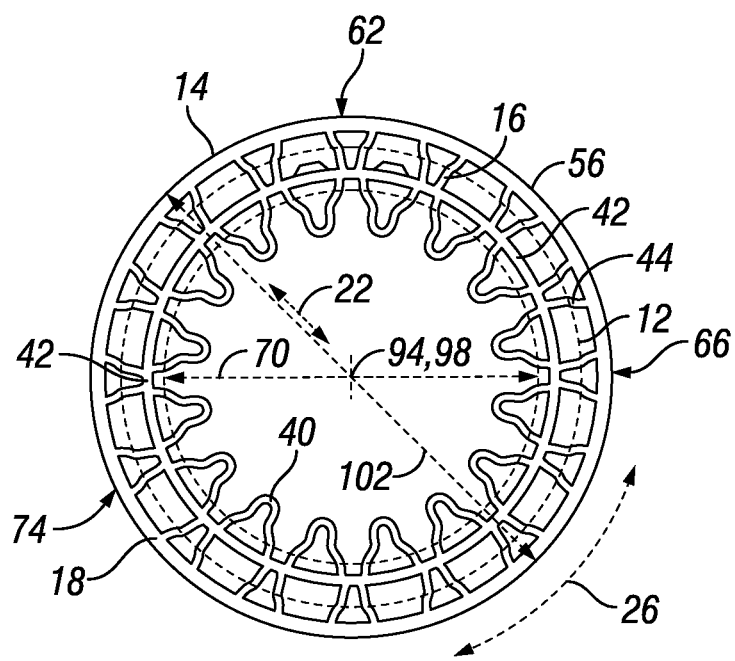
FIG. 7 is a side view elevation view of the intermediate section with the outer shear band ring superimposed in hidden lines to show their relative diameters.

FIG. 7 shows the size relationship between the outer shear band ring 12 and the intermediate section 14. With their axes 94 and 98 aligned so as to be coaxial, these components 12 and 14 are illustrated to show the inner diameter 70 of the outer shear band ring 12 being less than the outer diameter 102 of the intermediate section 14 when the intermediate section 14 is in the uncompressed state 62. It is to be understood that this size difference may be small and thus the illustrations shown in FIG. 7 are not to scale. The outer diameter 102 is greater than the inner diameter 70. The outer diameter 102 of the intermediate section 14 in the uncompressed state 62 can be from 0.1-0.4 millimeters greater than the inner diameter 70 of the outer shear band ring 12. In other embodiments, the outer diameter 102 may be from 0.4-0.8 millimeters greater, or from 0.8-1.0 millimeters greater than the inner diameter 70. In still other embodiments, the outer diameter 102 may be any amount greater than the inner diameter 70 sufficient to cause an interference fit between the outer shear band ring 12 and the intermediate section 14.

Once the outer shear band ring 12 and the intermediate section 14 are constructed, the adhesives 74, 76 may be applied to either the inner surface 72, the outer surface 66, or to both the inner surface 72 and the outer surface 66. Likewise, adhesive may be applied, if desired, to the outer surfaces of the second and third inner shear band rings 32 and 38 once these components are constructed. This application is can occur when the intermediate sections 14, 28 and 34 are in their uncompressed states 62.

Figure 8:
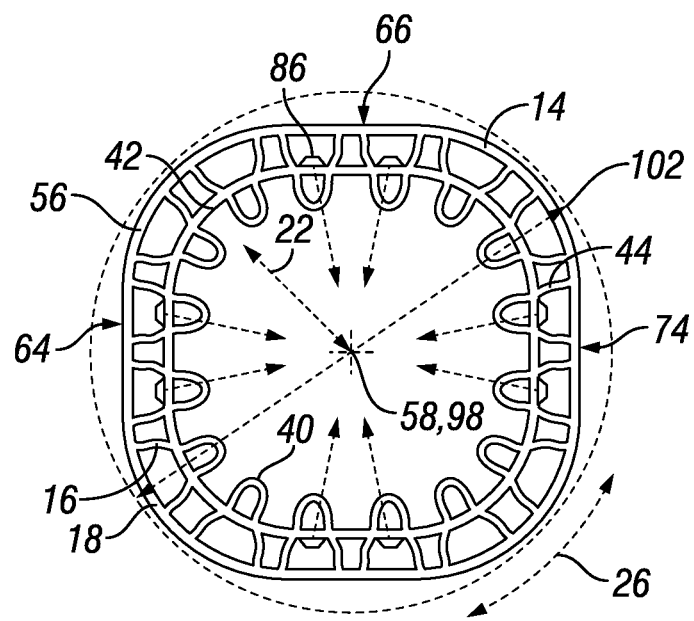
FIG. 8 is a side elevation view of an intermediate section in a compressed state.

Once the adhesive 74 and 76 is applied, the intermediate section 14 may be collapsed some amount in the radial direction 22. FIG. 8 shows the collapsing of the intermediate section 14 from the uncompressed state 62 to the compressed state 64. This collapsing may be into any type of shape. This collapsing allows the intermediate section 14 to be inserted into the interior of the outer shear band ring 12 as the exterior diameter of the intermediate section 14 will be less than the inner diameter 70 of the outer shear band ring 12. Once inserted, the intermediate section 14 will be allowed to expand so that the outer surface 66 of the intermediate section 14 engages the inner surface 72 of the outer shear band ring 12.

Any type of mechanism may be employed to collapse the intermediate section 14 so as to move the intermediate section 14 from an uncompressed state 62 to a compressed state 64. In some embodiments, a compression device that has a plurality of pins 86 can be used. The pins 86 may be inserted within the supporting structure 16 of the intermediate section 14. The pins 86 may be within voids defined by the inner surface of the inner shear band ring 18, the interface ring 42, and the outer V pair spoke section 44. The intermediate section 14 may be moved by the compression device while being held, or alternatively the other components of the non-pneumatic tire 10 can be brought to the intermediate section 14 when the intermediate section 14 is being held. The pins 86 can move inward in the radial direction 22 so that they all move towards the axis 98. In other mechanisms, some but not all of the pins 86 may move radially towards the axis 98.

Pin 86 engages the outer surface of the interface ring 42 such that the pin 86 engages the surface of the interface ring 42 that is farthest from the central axis 98 in the radial direction 22. The pin 86 is located within a pocket defined by the interface ring 42, the outer V pair spoke section 44, and the inner shear band ring 18. The other pins 86 are likewise located within pockets defined by the interface ring 42, outer V pair spoke section 44, and inner shear band ring 18 and engage the interface ring 42 on the portion of the interface ring 42 that is farthest in the radial direction 22 from the central axis 58.

The compression device can be actuated in order to cause the pins 86 to move inward in the radial direction 22 towards the central axis 98. This movement will cause the intermediate section 14 to deform so as to be placed into the compressed state 64. The entire outer surface 66 of the intermediate section 14 will be located closer to the central axis 98 in the compressed state 64 than the outer diameter 102 in the uncompressed state 62. The geometry of the supporting structure 16 may cause the intermediate section 14 to uniformly compress, or the supporting structure 16 may non-uniformly compress so that some portions of the outer surface 66 move closer to the central axis 98 in the radial direction 22 than other portions of the outer surface 66. As the inner shear band ring 18 is attached to the supporting structure 16, it will likewise move in the radial direction 22 when the intermediate section 14 is moved into the compressed state 64. The outer surface 66 may be uniformly moved during compression, or may be non-uniformly moved during compression so that portions of the outer surface 66 are closer to the central axis 98 in the radial direction 22 than other portions of the outer surface 66. The intermediate section 14 can be made so that it is inextensible from the uncompressed state 62. The outer surface 66 may thus not be capable of expanding or moving away from the central axis 98 in the radial direction 22 when in the uncompressed state 62.

The pins 86 may all move the same amount in the radial direction 22 to put the intermediate section 14 into the compressed state 64. Alternatively, some of the pins 86 may move while others remain stationary. This movement will likewise cause compression in the radial direction 22. No portion of the compression device, such as the pins 86, may engage the outer surface 66 during the compression as the outer surface 66 may be treated with the adhesive 74 as previously discussed. The arrows associated with the pins 86 illustrate the force applied and the direction of application of the force by them onto the intermediate section 14 for compression. In some embodiments, the force need not be directed at the axis 98. Here, the geometry of the supporting structure 16 can be set up so that force in a tangent direction with no component towards the central axis 98 may still cause compression in the radial direction 22. Although shown as all being directed towards the center, an unequal amount of force from the pins 86 can be realized so that a greater deformation occurs at certain arc length positions around the outer surface 66 than other arc length positions. Still further, the direction of force applied by the pins 86 need not be uniform so that some of them apply force in different directions with respect to the axis 98 so that some are directly towards the axis 98 while others are indirectly pointed at the axis 98.

Figure 9:
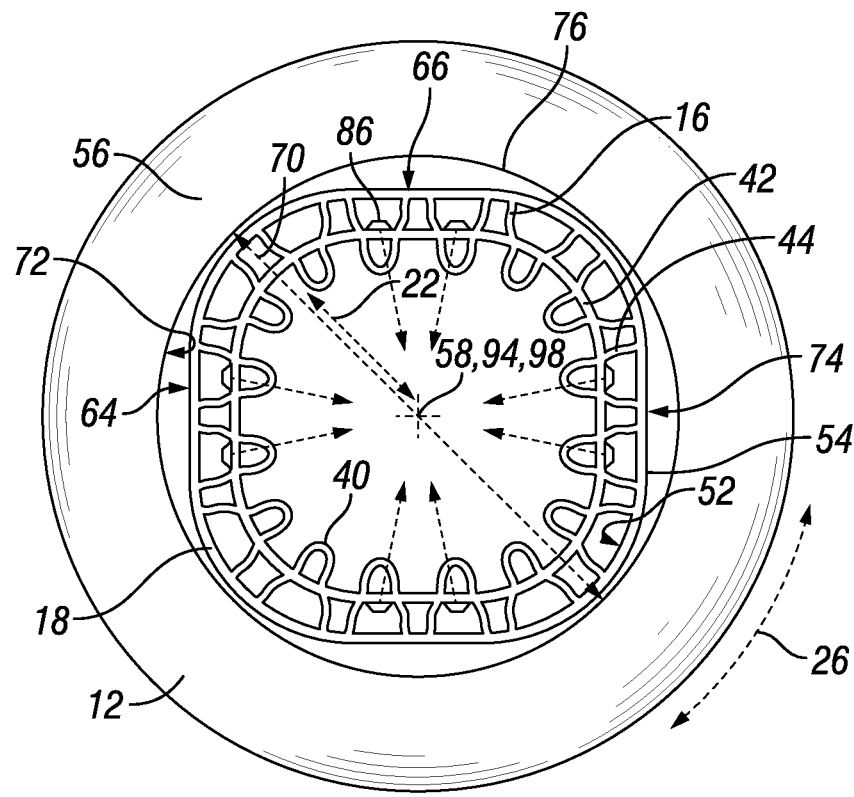
FIG. 9 is a side elevation view of the intermediate section in the compressed state inserted into the outer shear band ring.

The next step in the assembly process is the insertion of the intermediate section 14 in the compressed state 64 into the outer shear band ring 12 as shown in FIG. 9. The forces from the pins 86 may still be applied as the compression device is moved to position the intermediate section 14 inside of the inner diameter 70 of the outer shear band ring 12. Alternatively, the outer shear band ring 12 can be moved over the intermediate section 14 while the compression device remains stationary. No portion of the outer surface 66 may engage the outer shear band ring 12 during this insertion and positioning. The intermediate section 14 may be inserted without experiencing any interference with the outer shear band ring 12. The axis 98 can be coaxial with the axis 94 of the outer shear band ring 12. If the intermediate section 14 were put into the compressed state 64 so that some but not all of the outer surface 66 is moved closer to the axis 98, the axes 94 and 98 may not be arranged to be coaxial with one another. Here, the intermediate section 14 may be inserted within the outer shear band ring 12 so as to be offset some amount therefrom so that engagement between the outer surface 66 and the inner surface 72 does not occur.

The intermediate section 14 may not allow direct compression in the radial direction 22. In this regard, the forces applied by the pins 86 are not all of the same magnitude directly towards the axis 98 in the radial direction 22. A greater amount of force may be exerted at certain arc length portions of the intermediate section 14 than at other arc length portions. For example, a larger amount of force could be exerted over a 90 degree portion of the circumference of the intermediate section 14 than the remaining 270 degree portion of the intermediate section 14. By applying force in an unequal manner about various positions around the axis 98, the intermediate section 14 collapses in a specific manner and can be collapsed so that the entire outer surface 66 moves towards the central axis 58, but certain portions of the outer surface 66 move closer in the radial direction 22 than other portions of the outer surface 66.

Figure 10:
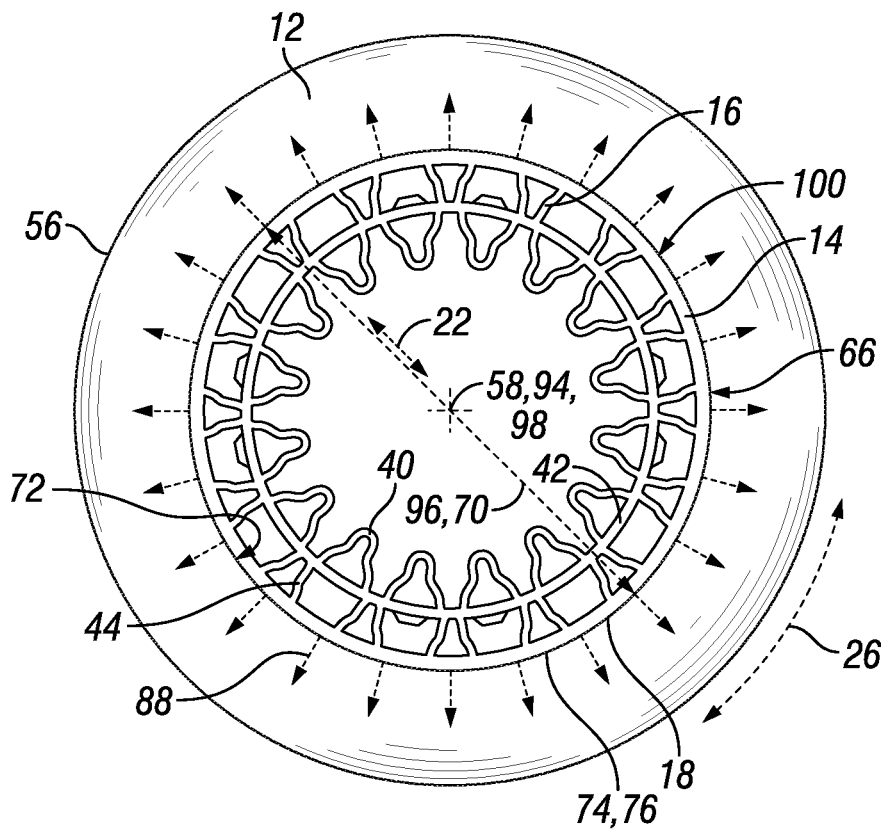
FIG. 10 is a side elevation view of the intermediate section in an interference fit state within the outer shear band ring.

With reference to FIG. 10, the compressive forces on the intermediate section 14 are released so that it is moved out of the compressed state 64 of FIG. 9. The intermediate section 14 moves in the radial direction 22 so that the outer surface 66 moves away from the axis 98 in the radial direction 22 and engages the inner surface 72. This expansion may be due to the elasticity of the intermediate section 14 that causes a spring back after the compressive forces are released. Due to the outer diameter 102 being larger than the inner diameter 70, the intermediate section 14 assumes a state of interference fit 100 in FIG. 10. Adhesive 74, 76 is located at the point of engagement between the surfaces 66 and 72. There may be little to no relative motion between the intermediate section 14 and the outer shear band ring 12 after this initial contact upon release. This lack of motion allows for accurate placement of the intermediate section 14 with respect to the outer shear band ring 12, and dislocation of the adhesive 74, 76 at this interface is prevented. The adhesive 74, 76 may be a connection that needs to be chemically or thermally cured in order to obtain a permanent connection between the intermediate section 14 and the outer shear band ring 12. The outer shear band ring 12 may thus be cured to the inner shear band ring 18 if one is present in the intermediate section 14. This curing could take place at this point in the process.

The fact that an interference fit state 100 is realized between the intermediate section 14 and the outer shear band ring 12 causes pressure to be applied at the connection between these two components 12, 14 by the stiffness of the intermediate section 14 that functions to cause this pressure in the interference fit state 100. A force 88 is applied by the interference fit state 100 along the entire circumference of engagement between the outer surface 66 and the inner surface 72. This force 88 can be uniform along the entire circumference of the engagement, and the pressure applied at this interface in some instances may be from 1-2 bar. In other arrangements, the pressure applied at the interface may be from 2-3 bar, from 3-4 bar, or up to 6 bar due to the interference fit state 100. The pressure applied at the interface may cause an even spread of the adhesive 74, 76 at this area. The applied pressure may prevent porosity and poor bonding when the area is subsequently cured.

The outer shear band ring 12 and/or the intermediate section 14 may be made of materials and in such a manner that they can compress to some degree when force is applied. This allows the interference fit state 100 to be realized. In some instances, the intermediate section 14 is compressed somewhat upon being released from the compressed state 64 such that it does not return to the uncompressed state 62. The intermediate section 14 assumes a size in between the compressed state 64 and the uncompressed state 62 so that its interference fit outer diameter 96 has a magnitude that is greater than its diameter in the compressed state 64, but less than the outer diameter 104 when in the uncompressed state 62.

In other embodiments, the intermediate section 14 assumes an interference fit state 100 in which its interference fit outer diameter 96 is the same as the outer diameter 102 when in the uncompressed state 62. In this regard, when the compressive force is released the intermediate section 14 springs back to its initial outer diameter 102 size and the outer shear band ring 12 is forced outward in the radial direction 22. An interference fit 100 is still realized in this configuration.

Figure 11:
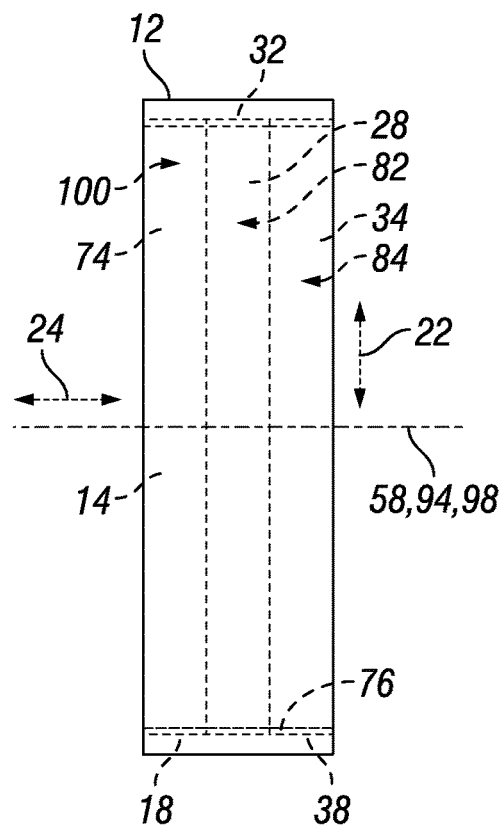
FIG. 11 is a front view of three intermediate sections within an outer shear band ring all in a state of interference fit.

With reference both to FIGS. 2 and 11, the second and third intermediate sections 28 and 34 can likewise be collapsed, inserted, and expanded for assembly with the outer shear band ring 12. The second intermediate 28 section has an outer diameter 78 that is greater than the inner diameter 70 of the outer shear band ring 12. Likewise, the third intermediate section 34 has an outer diameter 80 that is greater than the inner diameter 70. The relative sizes of the outer diameters 78 and 80 with respect to the inner diameter 70 allows for the second and third intermediate sections 28 and 34 to be arranged in an interference fit engagement with the outer shear band ring 12 and for pressure to be applied to the points of engagement to effect curing.

FIG. 11 shows the positioning of the second and third intermediate sections 28 and 34 into the outer shear band ring 12. The second intermediate section 28 engages both the first intermediate section 14 and the third intermediate section 34, and the first and third intermediate sections 14 and 34 are located at the axial ends of the outer shear band ring 12. The three intermediate sections 14, 28 and 34 when inserted extend along the entire width of the outer shear band ring 12 in the axial direction 24. The second intermediate section 28 is in a state of interference fit 82, and the third intermediate section 34 is in a state of interference fit 84 when compression is released. These states of interference fits 82 and 84 may be configured as previously discussed with respect to the state of interference fit 100 and a repeat of this information is not necessary. The second and third intermediate sections 28 and 34 can have adhesive applied to their outer surfaces, or the adhesive may otherwise be applied to the inner surface 72 in the same manners as previously discussed with respect to the first intermediate section 14. All of the intermediate sections 14, 28 and 34 can be collapsed, inserted and expanded at the same time, or they may be individually collapsed, inserted and expanded one after the other. The features of the intermediate sections 14, 28 and 34 can be arranged so that they are in register with one another, or they may be offset such that features such as spokes of the various intermediate sections 14, 28 and 34 are not aligned with one another in the axial direction 24.

Another method of assembly involves compression of the first intermediate section 14 and insertion into the outer shear band ring 12 and subsequent release into the interference fit state 100. After the first intermediate section 14 is released into the interference fit state 100, the second intermediate section 28 can then be compressed by the compression device and inserted into the outer shear band ring 12. The second intermediate section 28 may then be released so that it can expand within the outer shear band ring 12 to the state of interference fit 82. After this expansion, the third intermediate section 34 may then be collapsed by the compression device, inserted, and then subsequently released within the outer shear band ring 12 into the state of interference fit 84. As such, the intermediate sections 14, 28 and 34 can be inserted and assembled one by one in order within the outer shear band ring 12. The intermediate sections 14, 28 and 34 may all be cured at the point when they are assembled into the outer shear band ring 12. This curing may be accomplished by running this assembly through a curing oven until a proper bond is obtained between the intermediate sections 14, 28 and 34 and the outer shear band ring 12.

Once the intermediate sections 14, 28 and 34 are positioned within the outer shear band ring 12 regardless of whether it is simultaneous or one after the other, the adhesive at the interface between the intermediate sections 14, 28 and 34 and the outer shear band ring 12 can be treated based upon the particular type of adhesive employed. The adhesive at the interface can be cured by being treated with temperature, pressure and time sufficient to attain optimal curing as per the type of material used in the adhesive. The pressure can be applied solely by the interference fits of the intermediate sections 14, 28 and 34 and the rigidity of the intermediate sections 14, 28 and 34. Alternatively, mechanical pressure can also be applied by an outside element, such as a fixture assembly, in order to supplement the pressure applied by the interference fits of the intermediate sections 14, 28 and 34 in certain exemplary embodiments. As a still alternative, pressurizing inside of the intermediate sections 14, 28 and 34 may be achieved with an inflated bladder system or by a pressurized environment in the area of the interface. As such, although the pressure can be supplied solely by the interference arrangement of the components, it is also possible in some embodiments to supplement the pressure caused by the interference arrangement with other pressure application mechanisms. The intermediate sections 14, 28 and 34 may be simultaneously cured, or they may be cured one at a time based upon their order of insertion into the outer shear band ring 12.

Figure 12:
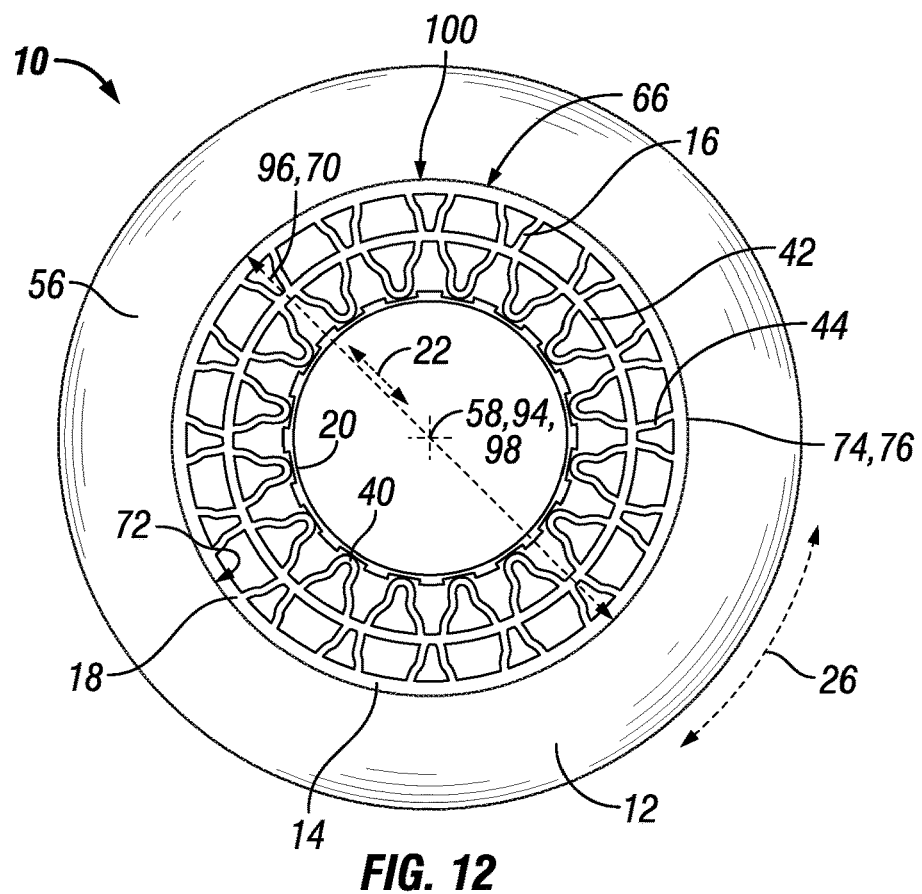
FIG. 12 is a side elevation view of a hub attached to an intermediate section that is disposed within an outer shear band ring.

The next step in the assembly process may involve the attachment of the hub 20 to the intermediate section 14, and any other intermediate sections 28 and 34 present. Insertion and attachment of the hub 20 is shown in FIG. 12. Although previously described as being cured at this point, if the adhesive 74, 76 of the various intermediate sections 14, 28 and 34 has not yet been cured before attachment of the hub 20 and requires curing, the adhesive 74, 76 may be attached at this point in the assembly.

The outer shear band ring 12 can include a series of reinforcements, and the various inner shear band rings 18, 32 and 38 may likewise include a series of reinforcements. The shear band rings 12, 18, 32 and 38 are all part of the shear band 56 and are not portions of the outer V pair spoke sections of the supporting structures 16, 30 and 36. The assembly described herein may thus feature the shear band 56 being provided as multiple parts that are subsequently assembled with one another into the resulting shear band 56. The inner shear band rings 18, 32 and 38 may not be rings that are of the same material as the outer V pair spoke sections 44 of the supporting structures 16, 30 and 36, but may instead be actual portions of the completed shear band ring 56.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of forming a non-pneumatic tire comprising the steps of:
   providing an outer shear band ring, wherein the outer shear band ring has an inner diameter;
   providing an intermediate section that has a supporting structure that has spokes comprising a thermoplastic elastomer, wherein the intermediate section is in an uncompressed state, wherein in the uncompressed state the intermediate section has an outer diameter, wherein the outer diameter of the intermediate section in the uncompressed state is greater than the inner diameter of the outer shear band ring;
   compressing the intermediate section from the uncompressed state to a compressed state;
   inserting the intermediate section when in the compressed state inside of the outer shear band ring; and
   releasing compression of the intermediate section when the intermediate section is inside of the outer shear band ring such that the intermediate section moves from the compressed state to a state of interference fit with the outer shear band ring;
   wherein the intermediate section has an outer surface that is located at the outer diameter of the intermediate section in the uncompressed state that extends 360 degrees about an axis of the intermediate section, wherein in the compressed state the entire outer surface is located closer to the axis of the intermediate section in a radial direction than the outer diameter of the intermediate section when in the uncompressed state;
   wherein the intermediate section has an inner shear band ring, wherein the inner shear band ring is located at the outer surface of the intermediate section, wherein the inner shear band ring engages the outer shear band ring after the step of releasing compression of the intermediate section.

2. The method as set forth in claim 1, wherein the inner shear band ring and the outer shear band ring form a shear band ring, and wherein the inner shear band ring includes two layers.

3. A method of forming a non-pneumatic tire comprising the steps of:
   providing an outer shear band ring, wherein the outer shear band ring has an inner diameter;
   providing an intermediate section that has a supporting structure that has spokes comprising a thermoplastic elastomer, wherein the intermediate section is in an uncompressed state, wherein in the uncompressed state the intermediate section has an outer diameter, wherein the outer diameter of the intermediate section in the uncompressed state is greater than the inner diameter of the outer shear band ring;
   compressing the intermediate section from the uncompressed state to a compressed state;

inserting the intermediate section when in the compressed state inside of the outer shear band ring; and releasing compression of the intermediate section when the intermediate section is inside of the outer shear band ring such that the intermediate section moves from the compressed state to a state of interference fit with the outer shear band ring;

wherein the supporting structure has an inner V pair spoke section and an interface ring, wherein the interface ring is located outward from the inner V pair spoke section in the radial direction, wherein the supporting structure has an outer V pair spoke section located outward from the interface ring in the radial direction;

wherein the state of interference fit of the intermediate section causes the application of pressure of from 1-2 bar onto an inner surface of the outer shear band ring 360 degrees around an axis of the outer shear band ring;

providing a hub; and positioning the hub inside of the intermediate section such that the intermediate section is located outward from the hub in the radial direction, wherein the positioning of the hub step is performed after the step of releasing compression of the intermediate section.

4. A method of forming a non-pneumatic tire comprising:

providing an outer shear band ring, wherein the outer shear band ring has an inner diameter;

providing an intermediate section that has a supporting structure, wherein the intermediate section is in an uncompressed state, wherein in the uncompressed state the intermediate section has an outer diameter, wherein the outer diameter of the intermediate section in the uncompressed state is greater than the inner diameter of the outer shear band ring;

compressing the intermediate section from the uncompressed state to a compressed state;

inserting the intermediate section when in the compressed state inside of the outer shear band ring; and releasing compression of the intermediate section when the intermediate section is inside of the outer shear band ring such that the intermediate section moves from the compressed state to a state of interference fit with the outer shear band ring;

wherein the intermediate section has an inner shear band ring, wherein the inner shear band ring is located at the outer surface of the intermediate section, wherein the inner shear band ring engages the outer shear band ring after releasing compression of the intermediate section, wherein a shear band ring includes the inner shear band ring and the attached outer shear band ring.

5. A method of forming a non-pneumatic tire comprising:

providing an outer shear band ring, wherein the outer shear band ring has an inner diameter;

providing an intermediate section that has a supporting structure, wherein the intermediate section is in an uncompressed state, wherein in the uncompressed state the intermediate section has an outer diameter, wherein the outer diameter of the intermediate section in the uncompressed state is greater than the inner diameter of the outer shear band ring;

compressing the intermediate section from the uncompressed state to a compressed state;

inserting the intermediate section when in the compressed state inside of the outer shear band ring; and releasing compression of the intermediate section when the intermediate section is inside of the outer shear band ring such that the intermediate section moves from the compressed state to a state of interference fit with the outer shear band ring;

wherein the intermediate section has an inner shear band ring, wherein the inner shear band ring is located at the outer surface of the intermediate section, wherein the inner shear band ring engages the outer shear band ring after releasing compression of the intermediate section, wherein the outer shear band ring has at least some materials that are the same as some materials of the inner shear band ring.

* * * * *